US006540917B1

(12) United States Patent
Rachels et al.

(10) Patent No.: US 6,540,917 B1
(45) Date of Patent: Apr. 1, 2003

(54) CYCLONIC INERTIAL FLUID CLEANING APPARATUS

(75) Inventors: David Lee Rachels, Greensboro, NC (US); Joshua Wilson Russell Kersey, Greensboro, NC (US)

(73) Assignee: Purolator Facet Inc., Greensboro, NC (US)

( * ) Notice: Subject to any disclaimer, the term of this patent is extended or adjusted under 35 U.S.C. 154(b) by 35 days.

(21) Appl. No.: 09/709,850

(22) Filed: Nov. 10, 2000

(51) Int. Cl.[7] .......................... B01D 21/26; B01D 45/12; B01D 45/16

(52) U.S. Cl. ......................... 210/512.1; 55/337; 55/394; 55/396; 55/450; 55/456; 55/457; 55/459.1

(58) Field of Search .............................. 210/512.1, 787; 55/392, 394, 434, 450, 456, 457, 459.1

(56) References Cited

U.S. PATENT DOCUMENTS

| | | |
|---|---|---|
| 4,311,494 A | 1/1982 | Conner et al. |
| 4,860,547 A | 8/1989 | Maldague |
| 4,886,523 A | 12/1989 | Maldague |
| 4,886,644 A | 12/1989 | Chan et al. |
| 4,976,748 A | 12/1990 | Prinsloo et al. |
| 4,985,058 A | 1/1991 | Prinsloo et al. |
| 5,129,930 A | 7/1992 | Gauthier et al. |
| 5,178,656 A | 1/1993 | Schott |
| 6,083,291 A | 7/2000 | Okada et al. |

*Primary Examiner*—David A. Reifsnyder
(74) *Attorney, Agent, or Firm*—Brinks Hofer Gilson & Lione

(57) ABSTRACT

An apparatus is disclosed for the cyclonic inertial separation of particles from a fluid stream, wherein a generator and an outlet tube are disposed within a housing, a scavenge port is disposed about the housing, and the outlet tube has a plurality of slots disposed about its outer diameter. Second and third pluralities of slots are preferably disposed about the outer diameter of the outlet tube, downstream of the first plurality of slots. The number of the first plurality of slots is preferably greater than the number of the second plurality of slots. The number of the second plurality of slots is preferably greater than the number of the third plurality of slots. The pluralities of slots are preferably ramped and circumferentially disposed about the outer diameter of the outlet tube. The outlet tube preferably has an upstream end with a conical surface shaped at an angle. The generator preferably has vanes that are helical and tapered at an angle.

18 Claims, 4 Drawing Sheets

Fig. 2c
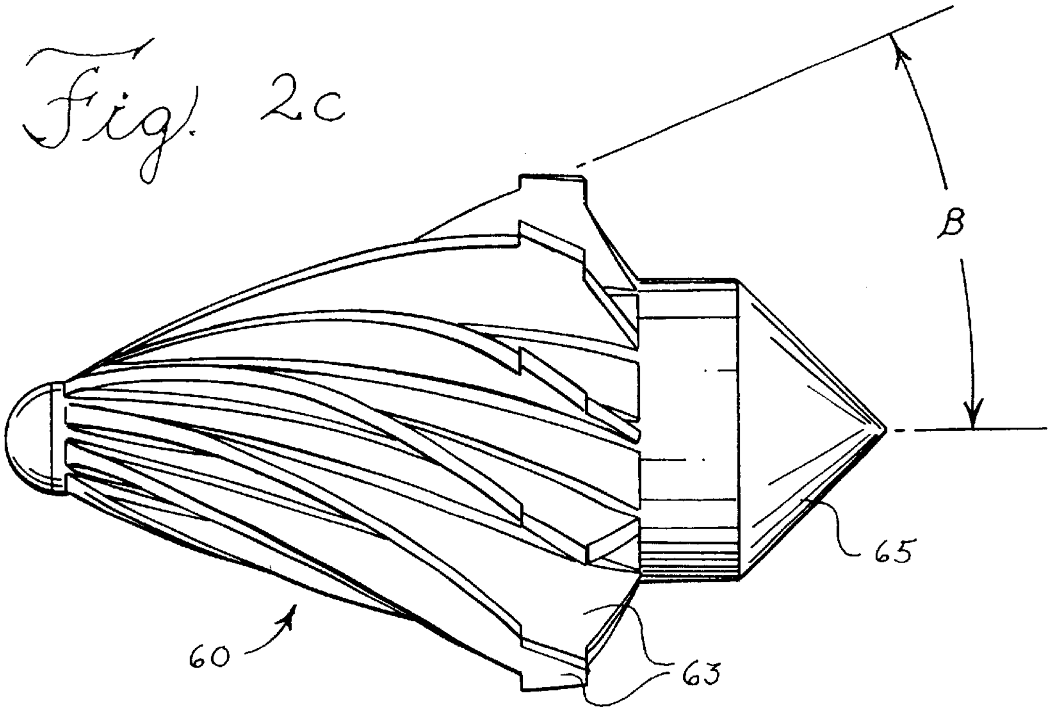
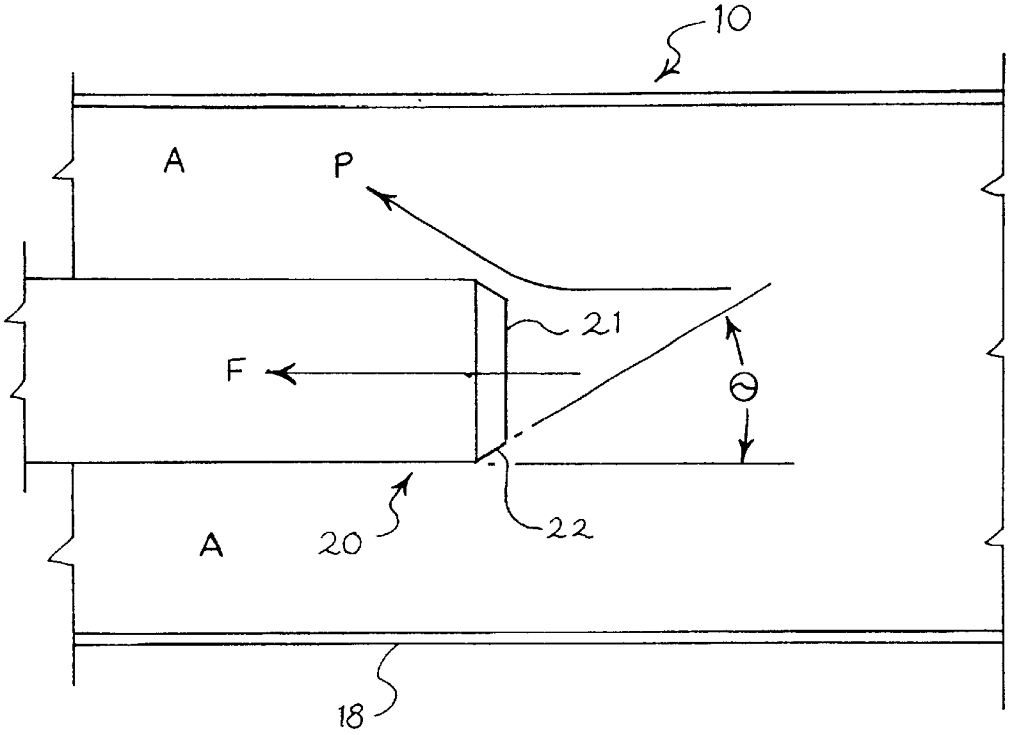
Fig. 3

CYCLONIC INERTIAL FLUID CLEANING APPARATUS

BACKGROUND OF THE INVENTION

This invention relates to the removal of particles or contaminants from a fluid stream, and more particularly, to the cyclonic inertial separation of particles from a main fluid stream.

Cyclonic inertial fluid cleaners or separators are known. Typically, a static generator, with straight or helical vanes, is located within a housing to impart a spin on the main fluid stream. The spin displaces particles in the main fluid stream radially outward. The main fluid stream then enters an outlet tube, with particles ideally traveling near the perimeter of the inner diameter of the housing and then traveling through a scavenge port.

Only the largest particles, however, have enough centrifugal force to stay near the perimeter of the inner diameter of the housing. If their centrifugal force is greater than their flow (radial inward) force at the entrance of the outlet tube, particles make it to the scavenge port. Thus, the radial inward velocities of the particles must be reduced to achieve sufficient separation or cleaning.

In addition, the non-uniform velocity profiles and high (radial inward) peak velocities result in inefficiencies and high pressure drops, which can lead to higher costs to replace the lost energy. In addition, safety risks can also result as particle-laden fluid streams traveling at high velocities wear down equipment, such as bearings and the like. Such cleaners can be enlarged in size to reduce velocities, but that can also increase costs and inefficiencies.

Accordingly, there is a need for a cyclonic inertial fluid cleaner that ensures more uniform velocity profiles and decreased velocities. A reduction in (radial inward) velocity enables the cleaner to achieve greater efficiencies and lower pressure drops. Moreover, there is a need for a cost-effective process that optimizes space and reduces safety risks.

SUMMARY OF THE INVENTION

The present invention provides an apparatus for cyclonic inertial fluid cleaning. In particular, an apparatus for separating particles from a fluid stream is provided that includes a housing, a generator, and an outlet tube. The housing has an entrance, a rear portion, a scavenge port, and at least one inner wall to define a space. The outlet tube is disposed within the space and has an inlet, an outlet, an upstream end, a downstream end, an inner diameter and an outer diameter. The generator has vanes disposed within the space between the housing entrance and the outlet tube inlet.

The apparatus of the present invention improves on the cleaners of the prior art by providing an outlet tube that has a plurality of slots disposed about its outer diameter. Consequently, the fluid stream flows from the housing entrance through the generator and toward the rear portion so that the fluid stream exiting the outlet tube is free of a substantial portion of the particles present in the fluid stream at the housing entrance. In addition, a substantial portion of the particles present in the fluid stream at the housing entrance exit the scavenge port. Accordingly, the apparatus of the present invention provides an apparatus that is effective in removing a substantial portion of the particles entering the housing entrance without creating an undesirable pressure drop.

In one aspect of the invention, a second plurality of slots is disposed about the outer diameter of the outlet tube and located between the downstream end and the first plurality of slots.

In another aspect of the invention, a third plurality of slots is disposed about the outer diameter of the outlet tube and located between the downstream end and the second plurality of slots.

In yet another aspect of the invention, the generator has vanes that are helical and tapered at an angle.

These and other features of the invention will become apparent upon review of the following detailed description of the presently preferred embodiments of the invention, taken into conjunction with the appended figures.

BRIEF DESCRIPTION OF THE DRAWINGS

FIG. 2C is a sectional schematic diagram of the generator with tapered helical vanes in the cyclonic inertial fluid cleaning apparatus according to a preferred embodiment of the present invention.

FIG. 3 is a sectional schematic diagram of the upstream end of the outlet tube in the cyclonic inertial fluid cleaning apparatus according to a preferred embodiment of the present invention.

DETAILED DESCRIPTION OF THE PREFERRED EMBODIMENTS

Figure 1:
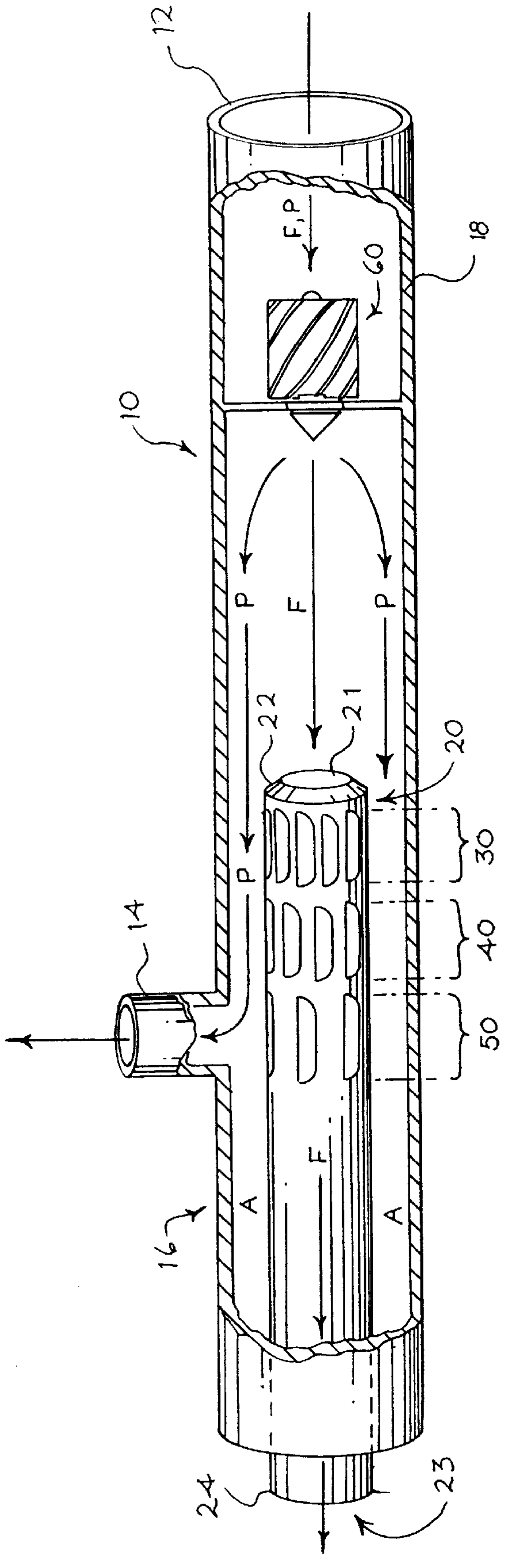
FIG. 1 is a sectional schematic diagram of the cyclonic inertial fluid cleaning apparatus according to a preferred embodiment of the present invention.

Referring now to FIG. 1, a preferred apparatus for separating particles from a fluid stream in accordance with the present invention is shown. The apparatus includes a housing 10, an outlet tube 20, and a generator 60. Housing 10 includes an entrance 12, a scavenge port 14, a rear portion 16, and at least one inner wall 18. Housing 10 may take any suitable shape but is preferably cylindrical and has an inner diameter and an outer diameter. A fluid stream F and particles P enter housing 10 through entrance 12. Fluid stream F may contain gases, liquids, or some combination thereof.

As fluid stream F and particles P enter housing 10, the radial inward velocities of fluid stream F and particles P act to force particles P inward towards the center axis of housing 10. The task of the present invention, as fluid stream F and particles P enter housing 10, is to direct particles P towards an annular area A between outlet tube 20 and housing 10 so as to minimize the amount of particles P that enter outlet tube 20.

Figure 2A:
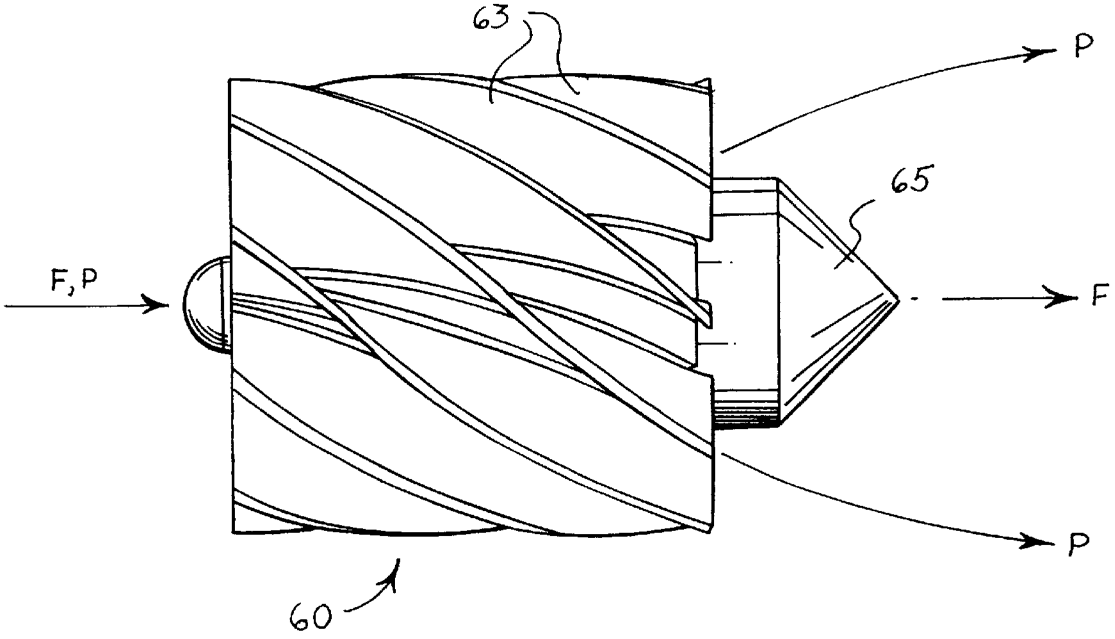
FIG. 2A is a sectional schematic diagram of the generator with untapered helical vanes in the cyclonic inertial fluid cleaning apparatus according to a preferred embodiment of the present invention.
Figure 2B:
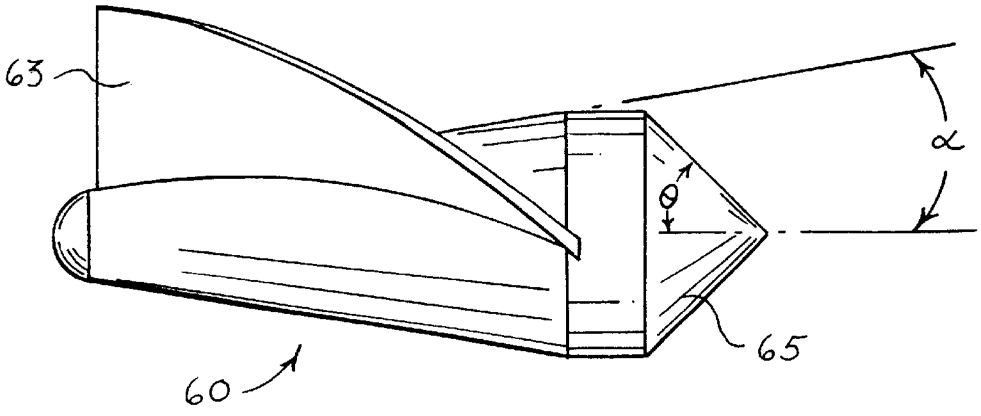
FIG. 2B is a sectional schematic diagram of the generator with one untapered helical vane in the cyclonic inertial fluid cleaning apparatus according to a preferred embodiment of the present invention.

A static generator 60 is preferably disposed within housing 10. As shown in FIG. 2A, generator 60 has vanes 63 that impart a spin on fluid stream F and particles P as fluid stream F and particles P continue through housing 10. The spinning action of fluid stream F forces particles P to the outside of fluid stream F into annular area A so long as the mass density of particles P is greater than the mass density of fluid stream F. As shown in FIG. 2B, generator 60 preferably has a conical body shaped at a first angle a that ranges from about 5 degrees to about 30 degrees, and is preferably about 10 degrees, which provides inertia to particles P as they are directed towards annular area A.

To achieve an effective spin rate, the number of vanes 63 can be increased or vanes that are helical can be used. The pressure drop increases as the number of vanes increases. The pressure drop also increases as either the helix pitch or helix angle of the vanes increases. Vanes 63 that are both tapered and helical, however, can achieve an effective spin rate while limiting the pressure drop because tapered helical vanes impose a more gradual spin on particles P than untapered helical vanes. Therefore, vanes 63 are preferably helical and, more preferably, helical and tapered.

In one embodiment, a generator 60 with tapered helical vanes is disposed within the space between the housing entrance 12 and the outlet tube inlet 21. The outlet tube 20 in such an embodiment can be non-slotted, as in the prior art, or slotted in accordance with the present invention. As shown in FIG. 2C, generator 60 has vanes 63 that are helical and tapered at a second angle $\beta$, which is greater than second angle $\alpha$. Second angle $\beta$ is preferably 5 degrees to 30 degrees greater than first angle $\alpha$, and is preferably about 23 degrees. The helix angle of the tapered helical vanes preferably ranges from about 30 to about 40 degrees, and is preferably about 35 degrees. The helix pitch preferably ranges from about 4 inches per revolution to about 8 inches per revolution, and is preferably about 6 inches per revolution.

As shown in FIG. 2B, generator 60 preferably has a back portion 65 with a conical surface shaped at a third angle $\theta$ that ranges from about 30 degrees to about 60 degrees, and is preferably about 45 degrees. The conical surface of back portion 65 allows fluid stream F to continue its path along the center axis of housing 10 while particles P travel towards annular area A.

Preferably, as shown in FIG. 1, outlet tube 20 has a longitudinal dimension that is substantially parallel to the longitudinal dimension of housing 10 so that the pressure drop along the length of housing 10 is minimized. Outlet tube 20, which is disposed within housing 10, may take any suitable shape but is preferably cylindrical and has an inner diameter and an outer diameter. Outlet tube 20 also has an inlet 21, an upstream end 22, an outlet 23, and a downstream end 24.

As shown in FIG. 1, scavenge port 14 is preferably disposed about housing 10 to draw most (at least 92%) of particles P that enter the annular area A between outlet tube 20 and housing 10, along with a small fraction (about 10%) of fluid stream F. Most of fluid stream F (about 90%)—with the small remaining amount of particles P—travels through outlet 23 of outlet tube 20.

Preferably, as shown in FIG. 3, upstream end 22 of outlet tube 20 has a conical surface shaped at a fourth angle $\phi$. The conical surface at fourth angle $\phi$ of upstream end 22 also acts to ramp particles P that are traveling axially near the upstream end 22 of outlet tube 20 outward. Particles P are thus directed towards the annular area A between outlet tube 20 and housing 10. Fourth angle $\phi$ preferably ranges from about 20 degrees to about 60 degrees and is preferably about 45 degrees. If fourth angle $\phi$ is less than 20 degrees, the directional impact on particles P is too slight. If fourth angle $\phi$ is greater than 60 degrees, a "pinball effect" results as particles P are deflected sharply toward the inner diameter of housing 10. Particles P then bounce between the outer diameter of outlet tube 20 and the inner diameter of housing 10, causing high pressure drops.

Figure 4:
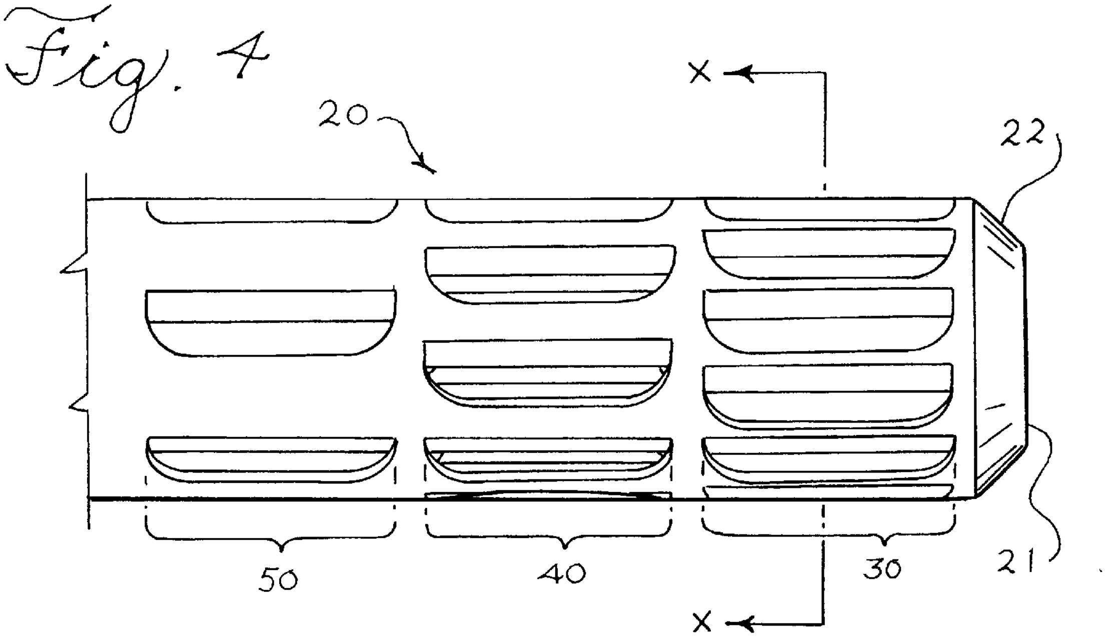
FIG. 4 is a sectional schematic diagram of the outlet tube in the cyclonic inertial fluid cleaning apparatus according to a preferred embodiment of the present invention.

As shown in FIGS. 1 and 4, outlet tube 20 preferably has a first plurality of slots 30 disposed about the outer diameter of outlet tube 20. Preferably, a second plurality of slots 40 is disposed about the outer diameter of outlet tube 20 and downstream of first group 30. The number of the first plurality of slots 30 is preferably greater than the number of the second plurality of slots 40.

More preferably, a third plurality of slots 50 is disposed about the outer diameter of outlet tube 20 and downstream of second plurality of slots 40. The number of the second plurality of slots 40 is preferably greater than the number of the third plurality of slots 50. The number of the first plurality of slots 30 is preferably about two times the number of the third plurality of slots 50. Also preferably, the pluralities of slots 30, 40, and 50 are circumferentially disposed about the outer diameter of the outlet tube 20.

This preferred design achieves area variation with three successive pluralities of slots 30, 40, and 50 disposed about the outer diameter of outlet tube 20. The number of slots preferably decreases as fluid stream F travels downstream—from upstream end 22 to downstream end 24—along the cylindrical axis of outlet tube 20. Thus, outlet tube 20 is preferably designed with more flow area upstream than downstream.

The pluralities of slots 30, 40, and 50 provide a large area (compared to the inner diameter area) that acts to decrease the radial inward velocity of fluid stream F and particles P. The non-uniform distribution of slots (slot area) acts to create a more uniform (radial inward) velocity profile along the length of outlet tube 20. The non-uniform distribution of slots counteracts the tendency for all the flow to enter outlet tube 20 downstream through the third plurality of slots 50. This tendency is caused by the greater restriction to flow from the inner diameter of outlet tube 20 compared to the less restrictive annular area A between outlet tube 20 and housing 10. The inner diameter of housing 10 is preferably about two times the inner diameter of outlet tube 20. The relative sizes of the inner diameter of housing 10 and the inner diameter of outlet tube 20 may vary from application to application. In one simulation performed by the inventors, the inner diameter of housing 10 was about 1.50 inches and the inner diameter of outlet tube 20 was about 0.80 inches. Such parameters may be common in applications for cleaning water or diesel fuel exhaust. However, for large-scale applications such as cleaning crude oil, the inner diameter of housing 10 may be about 24 inches.

Figure 5:
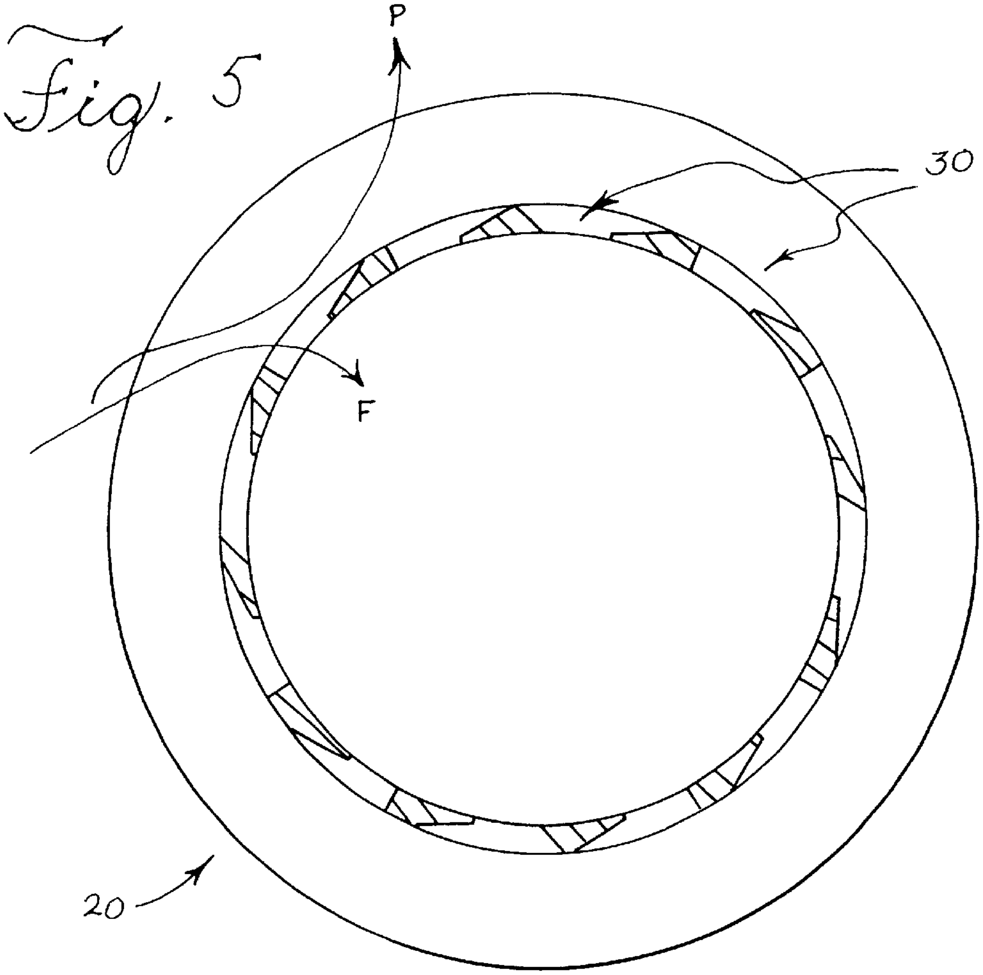
FIG. 5 is an enlarged cross-sectional view of FIG. 4, taken along section line XX, showing the first plurality of slots disposed about the outer diameter of the outlet tube in the cyclonic inertial fluid cleaning apparatus according to a preferred embodiment of the present invention.

Preferably, as shown in FIG. 5, at least one of the first plurality of slots 30 is ramped in the same direction as that of helical vanes 63 so as to direct particles P—which are attempting to enter outlet tube 20 through at least one of the first plurality of slots 30—outward towards the annular area A between outlet tube 20 and housing 10. Also preferably, at least one of the second plurality of slots 40 or the third plurality of slots 50 is ramped. In a preferred embodiment, each of the pluralities of slots 30, 40, and 50 is ramped. Particles P, having a mass density greater than that of fluid stream F, continue to travel radially outward as they are directed away from outlet tube 20 by the ramped pluralities of slots 30, 40, and 50. Because the fluid stream F is less dense than particles P, the fluid stream F travels radially inward into outlet tube 20 through pluralities of slots 30, 40, and 50 as the more dense particles P are ramped outward as they travel along the ramps.

The conical surface of upstream end 22 and the ramped design of the pluralities of slots 30, 40, and 50 in this preferred embodiment reduce radial inward velocities. The non-uniform area distribution resulting from the greater number of slots—and thus greater area—upstream acts to create a more uniform radial inward velocity profile, which decreases the peak radial inward velocity. Moreover, the ramped design of the pluralities of slots 30, 40, and 50 and the conical surface of upstream end 22 provide additional inertial separation of fluid stream F and particles P.

The resulting more uniform velocity profile has less peak (radial inward) velocity compared to a non-slotted design of outlet tube 20. Computational Fluid Dynamics (CFD) software supports this velocity profile, showing a peak (radial inward) velocity of 1000 inches/second for the non-slotted design compared to 250 inches/second for the slotted design. These values vary depending upon what radial location is chosen for the line extending through the annular area A between the outer diameter of outlet tube 20 and the inner diameter of housing 10. The velocities vary radially, as the velocities near the outer diameter of the outlet tube 20 are far greater than the velocities near the inner diameter of housing 10.

The smaller, more uniform radial inward velocities act to decrease the pressure drop caused by the unit. The high velocity—and thus turbulent nature—of fluid stream F results in mainly inertial losses. Inertial losses vary directly to the velocity, or change in velocity, squared. Therefore, the smaller and more uniform velocities in slotted outlet tubes result in significantly lower pressure drops when compared to outlet tubes with a single entry area.

Through velocity reduction, the slotted design acts to simultaneously increase efficiency (greater particle separation), decrease pressure drop, and decrease the required size of the outer diameter of housing 10 (also known as the "envelope requirement").

It is intended that the foregoing detailed description be regarded as illustrative rather than limiting and that it be understood that it is the following claims, including all equivalents, which are intended to define the scope of this invention.

What is claimed is:

1. An apparatus for separating particles from a fluid stream, comprising:

a housing having an entrance, a rear portion, a scavenge port disposed about the housing, and at least one inner wall to define a space;

an outlet tube disposed within the space and having an inlet, an outlet, an upstream end, a downstream end, an inner diameter and an outer diameter;

a generator disposed within the space between the housing entrance and the outlet tube inlet; and a first plurality of slots disposed about the outer diameter of the outlet tube, wherein the fluid stream flows from the housing entrance through the generator and then towards the rear portion such that the fluid stream exiting the outlet tube is free of a substantial portion of the particles present in the fluid stream at the housing entrance, and wherein a substantial portion of the particles present in the fluid stream at the housing entrance exit the scavenge port.

2. The apparatus of claim 1 further comprising a second plurality of slots disposed about the outer diameter of the outlet tube and located between the downstream end and the first plurality of slots.

3. The apparatus of claim 2 wherein the number of the first plurality of slots is greater than the number of the second plurality of slots.

4. The apparatus of claim 2 further comprising a third plurality of slots disposed about the outer diameter of the outlet tube and located between the downstream end and the second plurality of slots.

5. The apparatus of claim 4 wherein the number of the second plurality of slots is greater than the number of the third plurality of slots.

6. The apparatus of claim 4 wherein the number of the first plurality of slots is about two times the number of the third plurality of slots.

7. The apparatus of claim 4 wherein at least one of the third plurality of slots is ramped.

8. The apparatus of claim 4 wherein the third plurality of slots are circumferentially disposed about the outer diameter of the outlet tube.

9. The apparatus of claim 2 wherein at least one of the second plurality of slots is ramped.

10. The apparatus of claim 2 wherein the second plurality of slots are circumferentially disposed about the outer diameter of the outlet tube.

11. The apparatus of claim 1 wherein at least one of the first plurality of slots is ramped.

12. The apparatus of claim 1 wherein the first plurality of slots are circumferentially disposed about the outer diameter of the outlet tube.

13. The apparatus of claim 1 wherein the generator has a back portion shaped at an angle from about 30 degrees to about 60 degrees.

14. The apparatus of claim 1 wherein the generator has a conical body shaped at an angle from about 5 degrees to about 30 degrees.

15. The apparatus of claim 14 wherein the generator has helical vanes.

16. The apparatus of claim 15 wherein the generator has tapered vanes.

17. The apparatus of claim 16 wherein the vanes are tapered at an angle from about 5 degrees to about 30 degrees greater than the angle of the conical body of the generator.

18. The apparatus of claim 1 wherein the upstream end has a conical surface shaped at an angle from about 20 degrees to about 60 degrees.

* * * * *